United States Patent [19]
Kaufman et al.

[11] Patent Number: 5,936,012
[45] Date of Patent: Aug. 10, 1999

[54] CATIONIC ELECTROCOATING COMPOSITIONS, METHOD OF MAKING, AND USE

[75] Inventors: Marvin L. Kaufman, Pittsburgh; Patrick O'Neill, Glenshaw; Richard F. Karabin, Ruffs Dale; Gregory J. McCollum, Gibsonia, all of Pa.

[73] Assignee: PPG Industries Ohio, Inc., Cleveland, Ohio

[21] Appl. No.: 09/167,687

[22] Filed: Oct. 7, 1998

Related U.S. Application Data

[62] Division of application No. 08/700,977, Aug. 21, 1996, Pat. No. 5,820,987.

[51] Int. Cl.$^6$ ..................................... C08K 3/20
[52] U.S. Cl. ................ 523/404; 523/415; 523/421; 525/460; 525/504; 525/528; 525/533
[58] Field of Search ....................... 525/460, 504, 525/528, 533; 523/404, 415, 421

[56] References Cited

U.S. PATENT DOCUMENTS

| | | | |
|---|---|---|---|
| 3,454,482 | 7/1969 | Spoor et al. | 204/181 |
| 3,839,252 | 10/1974 | Bosso et al. | 260/29.2 EP |
| 3,922,253 | 11/1975 | Jerabek et al. | 260/77.5 TB |
| 3,984,299 | 10/1976 | Jerabek | 204/181 |
| 4,001,156 | 1/1977 | Bosso et al. | 260/29.2 EP |
| 4,031,050 | 6/1977 | Jerabek | 260/29.2 TN |
| 4,046,729 | 9/1977 | Scriven et al. | 260/29.2 TN |
| 4,066,591 | 1/1978 | Scriven et al. | 260/29.2 TN |
| 4,092,275 | 5/1978 | Reischl et al. | 260/2.5 BD |
| 4,134,866 | 1/1979 | Tominaga et al. | 260/18 PN |
| 4,147,679 | 4/1979 | Scriven et al. | 260/29.2 TN |
| 4,148,772 | 4/1979 | Marchette et al. | 260/29.2 EP |
| 4,182,831 | 1/1980 | Hicks | 528/103 |
| 4,184,990 | 1/1980 | Reischl et al. | 260/29.2 TN |
| 4,192,929 | 3/1980 | Wingfield, Jr. | 525/110 |
| 4,225,479 | 9/1980 | Hicks | 260/29.2 TN |
| 4,256,621 | 3/1981 | Shimokai et al. | 260/29.7 |
| 4,423,166 | 12/1983 | Moriarity et al. | 523/414 |
| 4,432,850 | 2/1984 | Moriarity et al. | 204/181 C |
| 4,435,559 | 3/1984 | Valko | 528/73 |
| 4,468,307 | 8/1984 | Wismer et al. | 204/181 C |
| 4,536,558 | 8/1985 | Kordomenos | 528/100 |
| 4,566,963 | 1/1986 | Ott et al. | 204/181.7 |
| 4,711,917 | 12/1987 | McCollum et al. | 523/400 |
| 4,837,291 | 6/1989 | Paar | 525/504 |
| 4,888,244 | 12/1989 | Masubuchi et al. | 423/416 |
| 4,931,157 | 6/1990 | Valko et al. | 204/181.7 |
| 4,933,056 | 6/1990 | Corrigan et al. | 204/181.7 |
| 5,026,743 | 6/1991 | Beresford et al. | 523/404 |
| 5,034,434 | 7/1991 | Beresford et al. | 523/404 |
| 5,089,542 | 2/1992 | Nishida et al. | 523/410 |
| 5,096,556 | 3/1992 | Corrigan et al. | 204/181.7 |
| 5,157,060 | 10/1992 | Redman | 525/509 |
| 5,250,164 | 10/1993 | Valko | 204/181.7 |
| 5,260,354 | 11/1993 | Kaylo et al. | 523/402 |
| 5,407,976 | 4/1995 | Uhlianuk | 523/415 |
| 5,480,762 | 1/1996 | Toyama et al. | 430/302 |

FOREIGN PATENT DOCUMENTS

| | | |
|---|---|---|
| 1179433 | 12/1984 | Canada . |
| WO96/12771 | 5/1996 | WIPO . |
| WO98/07770 | 2/1998 | WIPO . |

*Primary Examiner*—Randy Gulakowski
*Attorney, Agent, or Firm*—Kenneth J. Stachel; Ann Marie Cannoni

[57] ABSTRACT

An electrodepositable composition that has: (A) an active hydrogen-containing cationic resin, electrodepositable on a cathode, having: (1) a polyepoxide; (2) an oxygen-substituted diamine compound having the following formula:

Formula I

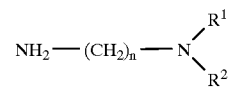

where n is an integer from 2 to 4; and where $R^1$ or $R^2$ are the same or different and either one or both contain at least one oxygen and are alkyl, cycloalkyl, substituted alkyl, or substituted cycloalkyl having from 1 to 6 carbon atoms, or $R^1$ and $R^2$ are alkanol groups having from 2 to 6 carbon atoms, or $R^1$, $R^2$, and the N atom form a cyclic group which is substituted or unsubstituted such as morpholine and 1-(3-aminopropyl) imidazole; and (B) at least partially blocked isocyanate or polyisocyanate curing agent. The diamine compound of Formula I can be used alone or in conjunction with one or more secondary amines, nonhydroxy group containing amines and/or amines with ring structures. Optionally, the polyepoxide can be chain extended with active hydrogen-containing compounds other than polyoxyalkylene polyamines. Also provided is a method of producing an active hydrogen-containing cationic resin composition, electrodepositable on a cathode, comprised of (a) mixing together in a suitable reaction vessel a polyepoxide, or the precursors of the polyepoxide, a polycarboxylic acid, a blocked isocyanate curing agent; (b) adding to the mixture of (a) a base catalyst and the diamine compound of Formula I; (c) polymerizing the mixture of (b) to form a resinous composition; and (d) neutralizing the resinous composition of (c) by adding the resinous composition to a dilute mixture of acid and water to form an aqueous dispersed electrodepositable cationic resin composition.

19 Claims, No Drawings

CATIONIC ELECTROCOATING COMPOSITIONS, METHOD OF MAKING, AND USE

This is a divisional of U.S. patent application Ser. No. 08/700,977, filed Aug. 21, 1996, now U.S. Pat. No. 5,820,987.

The present invention relates to cationic electrocoating compositions, the method of making these compositions, and their use in electrodeposition. More particularly, this invention relates to cationic electrocoating compositions which are lead free or free of any added lead.

Electrodeposition is a coating application method which involves the deposition of a film-forming composition under the influence of an applied electrical potential. Electrodeposition has become increasingly important in the coatings industry because by comparison with nonelectrophoretic coating means, electrodeposition offers higher paint utilization, outstanding corrosion protection and low environmental contamination. Initially, electrodeposition was conducted with the workpiece being coated serving as an anode. This was familiarly referred to as "anionic electrodeposition". However, in 1972 cationic electrodeposition was introduced commercially. Since that time cationic electrodeposition has steadily gained in popularity and today it is by far the most prevalent method of electro-deposition. Throughout the world, a majority of the motor vehicles produced are given a primer coating by cationic electrodeposition. Other areas of application are primer coating and one-coat top coating of automobile accessories, farm machinery, house and electrical appliances, steel furniture and various structural components.

Recent environmental laws have necessitated the formulation of cationic electrodeposition coatings that do not contain heavy metals such as lead. Some problems which may be encountered with these new compositions include decreased performance characteristics such as decreased corrosion resistance, chip resistance, throw power, cure response, and lower pH of the electrodeposition coating bath. Such a low pH of the bath can cause corrosivity problems with the tank, piping and electrodes of the electrodeposition or electrocoating system. The need exists for a composition that is free of intentionally added lead but that meets the requirements of corrosion resistance, chip resistance, throw power, cure response, and pH of existing electrodepositable compositions that contain lead.

A number of electrodepositable compositions based on amine-epoxy chemistry usually require the presence of lead to achieve their performance characteristics. This lead is typically added with the pigments and/or through the use of lead silicate.

The first cationic electrodepositable compositions used amine salt group-containing resins or onium salt-group containing resins as the binder, see, for example, U.S. Pat. No. 3,454,482 to Spoor et al. and U.S. Pat. No. 3,839,252 to Bosso et al. These compositions required the use of lead to achieve adequate performance characteristics.

U.S. Pat. No. 4,192,929 to Wingfield discloses the use of a secondary amine that is mostly hydroxy amine to make an amine group-containing resin in a corrosion resistant electrodepositable primer. This primer also utilizes amine aldehyde resin crosslinking agents in order to cure the electrodeposited primer.

U.S. Pat. Nos 4,182,831 and 4,225,479 to Hicks teach the use of a mixture of primary amines having an aliphatic monoamine and an aliphatic diamine in a cationic epoxide resinous compound. The diamine has one primary and one tertiary amine group.

U.S. Pat. No. 5,034,434 to Beresford et al. teaches the use of a monoprimary amine containing a tertiary amino group as a partial replacement of a polyoxyalkylene polyamine which is coreacted with a secondary amine, a polyepoxide, and a monoepoxide in a cationic resin useful in electrodepositable coating compositions. Compositions disclosed in Beresford et al. are rich in polyoxyalkylene polyamines, and as noted in Examples 12 and 14 of Beresford et al., lead silicate is added in the pigment paste. Beresford et al. shows that a reduction of the proportion of polyoxyalkylene polyamine can be achieved by replacing some of it with a monoprimary amine with reactive hydrogen atoms reactive with the epoxide group. Such monoprimary amine may also contain a tertiary amino group within its structure like dimethylaminopropylamine, diethylaminopropylamine, N-aminopropyldiethanolamine or N-aminopropyl-morpholine.

Unfortunately for the aforementioned electrodepositable coating compositions, each has one or more components that can adversely affect the performance characteristics of an electrodepositable coating composition. For instance, polyoxyalkylene polyamines like those used in the Beresford et al. patents can result in poorer corrosion resistance and frequently can interfere with chip resistance, throw power, and intercoat adhesion of the electrocoat coatings. Also, the presence of alkylamines in an all aliphatic amine system for the amine reactant for the epoxy can present difficulties in obtaining ungelled compositions for use in electrodeposition. Additionally, the alkylamines as disclosed in Hicks can interfere with chip resistance of typical electrodeposited coatings. Also amine aldehyde resin crosslinking agents can result in poorer cure response and corrosion resistance for electrodeposited coatings. In electrodepositable coating compositions with added lead, the possible adverse effects of these various materials might be tolerated because of the benefits associated with the presence of lead. However, in the more environmentally attractive reduced lead or lead-free electrodepositable coating compositions, the effects from these various components may be problematic in achieving performance characteristics like that of compositions with added lead.

It is an object of the present invention to provide a cationic electrocoating composition that without the addition of lead or with a reduced lead level has consistent, improved chip resistance, throw power and pH control, with good cure response and corrosion resistance.

SUMMARY OF THE INVENTION

In accordance with the present invention, there is provided a cationic electrodepositable composition that has: (A) a nongelled active hydrogen-containing cationic resin, electrodepositable on a cathode, having: (1) a polyepoxide (2) an oxygen-substituted diamine compound having the following formula:

Formula I

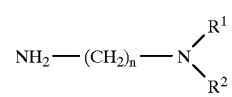

where n is an integer from 2 to 4; and where $R^1$ or $R^2$ are the same or different and either one or both contain at least one oxygen and are alkyl, cycloalkyl, substituted alkyl, or substituted cycloalkyl having from 1 to 6 carbon atoms, or $R^1$ and $R^2$ are alkanol groups having from 2 to 6 carbon atoms, or $R^1$, $R^2$, and the N atom of the tertiary amine group forms a cyclic group which is substituted or unsubstituted such as morpholine and 1-(3-aminopropyl)imidazole; and (B) at least partially blocked isocyanate or polyisocyanate curing agent. In other words this amine compound of Formula I can be referred to as an alkylenediamine with a primary amine and a tertiary amine group where the tertiary amine has two alkyl groups or a cyclic alkyl group where such groups have oxygen substitution like oxygen-substituted n,n-alkyl-containing alkylenediamine. Hereinafter, this amine compound is referred to as "oxygen substituted diamine". This oxygen substituted diamine can be used alone or in conjunction with one or more additional amines including secondary amines, nonhydroxy-containing amines, and/or amines with ring structures. However, any combination of amines with the oxygen substituted diamines is essentially free of polyoxyalkylene polyamine.

In the electrodepositable composition, the polyepoxide optionally can be chain extended with active hydrogen-containing materials other than polyoxyalkylene polyamines. Also, the electrodepositable composition can have an aqueous or aqueous and organic solvent carrier. Such a electrodepositable composition has a nongelled reaction product of the polyepoxide and amine of Formula I with or without secondary amines and/or nonhydroxyl containing amines and/or amines with a ring structure, which can be referred to as "epoxide amine resinous adduct". Also, the "active hydrogen-containing electrodepositable cationic resin composition" with or without the isocyanate or polyisocyanate curing agent can be at least partially neutralized with acid to achieve a neutralized aqueous cationic electrodepositable resin composition, which can be used as the aqueous electrodepositable composition. Also additional materials such as pigments and modifying materials can be used in the electrodepositable composition.

Also provided as another aspect of the invention is a method of producing a nongelled active hydrogen-containing cationic resin composition, electrodepositable on a cathode, comprised of (a) mixing together in a suitable reaction vessel a polyepoxide, or the precursors of the polyepoxide, a polycarboxylic acid, at least partially blocked isocyanate or polyisocyanate curing agent; (b) adding to the mixture of (a) a base catalyst and the amine compound of Formula I described above; (c) polymerizing the mixture of (b) to form a resinous composition; and (d) neutralizing the resinous composition of (c) by adding the resinous composition to a dilute mixture of acid and water to form an aqueous dispersed electrodepositable cationic resin composition.

DETAILED DESCRIPTION OF THE INVENTION

Surprisingly, these amine compounds represented by Formula I, which are monomeric, when reacted with the polyepoxide and formulated into the nongelled active hydrogen-containing electrodepositable cationic resin composition and possibly combined with other optional materials result in an aqueous dispersed electrodepositable composition with proper cure without the addition of lead to the coating. The invention provides improved cure preferably even in the absence of lead which normally can contribute to cure. Eliminating the addition of lead to the coating composition of the present invention makes the coating more environmentally desirable.

The oxygen substituted diamine of Formula I when used alone as the only type of amine reactant for the polyepoxide to form the epoxide amine resinous adduct generally is used in at least that amount sufficient to allow the nongelled active hydrogen-containing electrodepositable cationic resin composition and preferably the cationic electrodepositable composition to be transportable to the cathode when acid solubilized. Suitable oxygen substituted diamines include dihydroxyalkyl aminoalkyl amine like aminopropyldiethanolamine and/or aminopropylmorpholine and/or N-(2-amino-ethyl)-morpholine. The aminopropyldiethanolamine is preferred. It is believed, without limiting the invention, that these oxygen substituted diamines react with the polyepoxide so that oxygen atoms are pendant as part of the amine moiety of the amine-epoxide adduct.

Optionally, the cationic electrodepositable composition can additionally contain one or more secondary amines, where up to about 70 percent of NH equivalents of the reactants for producing the active hydrogen-containing electrodepositable cationic resin composition of the electrodepositable composition are supplied by the secondary amine and about 30 to 100 percent of the NH equivalents are supplied by the oxygen-substituted diamine. Preferably, about 20 to 50 percent of the NH equivalents are supplied by the secondary amine and about 50 to 80 percent of the NH equivalents are supplied by the oxygen substituted diamine. Most preferably, the secondary amine is present in an amount to supply about 20 to 30 percent of NH equivalents of the reactants and about 70 to 80 percent of the NH equivalents of the reactants are supplied by the oxygen-substituted diamine compound. Some nonlimiting examples of secondary amines include dialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, N-phenylethanolamine and diisopropanolamine.

Amines which do not contain hydroxyl groups can also be used such as diamines and mixed alkyl-aryl amines and substituted amines in which the substituents are other than hydroxyl and in which the substituents do not detrimentally affect the epoxy-amine reaction can also be used. Specific examples of these amines are methylethylamine, diethylamine, dipropylamine, dibutylamine, dicocoamine, diphenylamine, N-methylaniline, diisopropylamine, methylphenylamine and dicyclohexylamine. Also, amines with ring structures such as morpholine, piperidine, N-methylpiperazine and N-hydroxyethylpiperazine can be used. In addition, ketimines such as diethylenetriamine diketimine can be used. Any or a combination of these amines can replace some or all of the secondary amine used in combination with the oxygen-substituted diamine.

Most preferably, the oxygen substituted diamine on a weight basis is the predominant amine in any combination or mixture with the aforementioned secondary amines and/or nonhydroxy-containing amines and/or other amines. Also, preferably polyoxyalkylene polyamines and alkylmono primary amines are absent from any such combination or mixture of amines.

The polyepoxides used in the practice of the present invention can be saturated or unsaturated, cyclic or acyclic, aliphatic, alicyclic, aromatic or heterocyclic as are known to those skilled in the art. Also, the polyepoxides may contain substituents such as halogen, hydroxyl, and ether groups. Examples of polyepoxides are those polymers having a 1,2-epoxy equivalency greater than one and preferably about two, that is, polyepoxides which have on an average basis two epoxy groups per molecule as are well known in the art. The preferred polyepoxides are polyglycidyl ethers of cyclic polyols. Particularly preferred are polyglycidyl ethers of polyhydric phenols such as bisphenol A. These polyepoxides can be produced by or have precursors of etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis(4-hydroxyphenyl)ethane, 2-methyl-1,1-bis(4-hydroxyphenyl) propane, 2,2-bis(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol; 1,4-cyclohexanediol; 1,2-bis (hydroxymethyl)cyclohexane, 1,3-bis(hydroxymethyl) cyclohexane; and hydrogenated bisphenol A.

Further examples of the polyepoxide polymers with molecular weights of around 200 to 2000 generally are shown in U.S. Pat. Nos. 4,711,917 (columns 5–8); 4,031,050 (columns 3–5); and 3,922,253 (columns 1–2). The preferred polyepoxides have number average molecular weights ranging from about 340 to about 2000.

In general, the epoxide equivalent weight of the polyepoxide will range from 100 to about 2000 and preferably from about 180 to 500. Epoxy group-containing acrylic polymers such as those of U.S. Pat. No. 4,001,156 in columns 3–6 can also be used but they are not preferred. The term "epoxy equivalent weight", as used in the present specification and the claims at the end hereof, denotes the reciprocal of the equivalents of the epoxy groups contained per gram of an epoxy compound and can be measured by any known determination method. Examples of these include infrared (IR) spectroscopy or the HCl-pyridine titration method through reaction with excess HCl in pyridine and titration of the remaining HCl with sodium methoxide, or titration in chloroform with perchloric acid in the presence of excess tetraethylammonium bromide and glacial acetic acid with an agitator of crystal violet (hexamethyl pararosaniline chloride, or by titrating a sample of the reaction product with tetrabutylammonium iodide and perchloric acid).

Chain-extended polyepoxide polymers can also be used and are preferred. Generally, chain extension can be by reacting together a polyepoxide and a polyhydroxyl group-containing material selected from alcoholic hydroxyl group-containing materials and phenolic hydroxyl group-containing materials to chain extend or build the molecular weight of the polyepoxide. A chain-extended polyepoxide may be prepared by any method known to those skilled in the art and is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained. The equivalent ratio of reactants, i.e., epoxy:polyhydroxyl group-containing material is typically from about 1:0.75 to 1:2. These materials and the reactions to produce them are more fully described in U.S. Pat. Nos. 4,148,772 (columns 2–6) and 4,468,307 (columns 2–4) and Canadian Patent 1,179,433, all hereby incorporated by reference for their teachings on chain extension of polyepoxides.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157, all of which are incorporated by reference for these teachings. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

Also, the chain extension of the polyepoxides optionally but preferably can be with a polycarboxylic acid material, preferably a dicarboxylic acid. Useful dicarboxylic acids include acids having the general formula: HOOC—R—COOH, where R is a divalent moiety that is substantially unreactive with the polyepoxide. R can be a straight chained or a branched alkylene or alkylidene moiety normally containing from 2 to 42 carbon atoms. Some examples of suitable dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid and the like. It should be understood that dicarboxylic acids of the above general formula where R is a moiety of less than 4 carbon atoms can include, for example, oxalic acid, malonic acid, succinic acid, and glutaric acid, but these acids are less preferred. Additional suitable dicarboxylic acids include substantially saturated acyclic, aliphatic dimer acids formed by the dimerization reaction of fatty acids having from 4 to 22 carbon atoms and a terminal carboxyl group (forming dimer acids having from 8 to 44 carbon atoms). Dimer acids are well known in the art and are commercially available from Emery Industries, Inc. under the EMPOL tradename.

Dicarboxylic acids can be formed as reaction products of anhydrides and diols or diamines at reaction conditions and techniques known to those skilled in the art for the particular reactants. The most preferred dicarboxylic acids are formed by the reaction product of a diol and an anhydride. Diols can include polytetramethylene glycols, polycaprolactones, polypropylene glycols, polyethylene glycols and the like. Preferably, the diol is the reaction product of bisphenol A and ethylene oxide. Suitable anhydrides include maleic, phthalic, hexahydrophthalic, tetrahydrophthalic and the like. Preferably, the anhydride is hexahydrophthalic anhydride. Additionally, dicarboxylic acids formed by the reaction of an anhydride and a diamine can be used. Dicarboxylic acids formed by the reaction of a polyoxyalkylenediamine such as polyoxypropylenediamine, commercially available from Huntsman Chemical Company under the tradename JEFFAMINE, with an anhydride like those listed above can be used. Preferably, the anhydride is hexahydrophthalic anhydride and the diamine is JEFFAMINE D-400 or D-2000.

Typically, the amount of dicarboxylic acid used to chain extend the polyepoxide is sufficient to provide from about 0.05 to 0.6, preferably from about 0.2 to 0.4 acid groups per epoxide group. This reaction is normally carried out at between about 80° C. to 175° C.

The amount of all of the amine reacted with the polyepoxide as noted above for the oxygen substituted diamine is at least that amount sufficient to render the active hydrogen-containing electrodepositable cationic resin composition cationic in character. In some instances, substantially all of the epoxy groups in the resin may be reacted with an amine. However, excess epoxy groups may remain which hydrolyze upon contact with water to form hydroxyl groups. In general, the electrodepositable cationic resin should contain from about 0.1 to 3.0, preferably from about 0.3 to 1.0 milliequivalents of cationic group per gram of resin solids (including the isocyanate curing agent).

The electrodepositable composition of the present invention also contains a blocked or capped isocyanate or polyisocyanate curing agent. Preferably, the active hydrogen-containing electrodepositable cationic resin composition has the blocked or capped isocyanate or polyisocyanate curing agent. The curing agent may be a fully capped with substantially no free isocyanate groups, or it may be partially capped and reacted with the resin backbone of the active hydrogen-containing electrodepositable cationic resin as described in U.S. Pat. No. 3,984,299. The isocyanate curing agent can be an aliphatic or an aromatic diisocyanate or polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane4,4',4"-triisocyanate; 1,2,4-benzene triisocyanate; polymethylene polyphenyl polyisocyanate; and methylene polyphenyl polyisocyanate.

Isocyanate-prepolymers such as reaction products of polyisocyanates with polyols such as neopentyl glycol and trimethylolpropane and with polymeric polyols such as polycaprolactone diols and triols (NCO/OH equivalent ratio greater than one) can also be used. A mixture containing diphenylmethane4,4'-diisocyanate and polymethylene polyphenyl polyisocyanate is preferred.

The preferred capped isocyanates or organic polyisocyanate curing agents or crosslinkers are those in which the isocyanato groups have been reacted with a compound so that the resultant capped isocyanate is stable to active hydrogens at room temperature but reactive with active hydrogens at elevated temperatures, usually between 80° C. and 200° C. Any suitable aliphatic, cycloaliphatic, aromatic alkyl monoalcohol and phenolic compound may be used as a capping agent in accordance with the present invention such as, for example, lower aliphatic alcohols containing from 1 to 4 carbon atoms such as methanol, ethanol and n-butyl alcohol; cycloaliphatic alcohols such as cyclohexanol; aromatic-alkyl alcohols such as phenyl carbinol and methylphenyl carbinol; phenolic compounds such as phenol itself, substituted phenols in which the substituents do not adversely affect coating operations. Examples include cresol and nitrophenol. Also useful are glycol ethers such as ethylene glycol monobutyl ether, ethylene glycol monohexyl ether, propylene glycol monomethyl ether, diethylene glycol monobutyl ether, and dipropylene glycol monobutyl ether, and glycols as described in U.S. Pat. Nos. 4,435,559 and 5,250,164 to Valko et al., including ethylene glycol, propylene glycol and butylene glycol. Additional capping agents include oximes such as methyl ethyl ketoxime, acetone oxime and cyclohexanone oxime and lactams such as epsilon-caprolactam. Preferred capping agents are low molecular weight capping agents like ethylene glycol monobutyl ether and propylene glycol.

Usually, a sufficient amount of the at least partially blocked polyisocyanate is present in the electrodepositable composition, preferably in the active hydrogen-containing electrodepositable cationic resin composition, such that there is about 0.1 to about 1.2 capped isocyanate groups for each active hydrogen, i.e., hydroxyl, primary and secondary amino. When measured as a weight percentage of resin solids, the blocked isocyanate is present from about 5 to 60 percent, preferably from about 25 to 50 percent.

The partially neutralized active hydrogen-containing electrodepositable resin composition with or without at least partially blocked isocyanate curing agent can be made using any technique known in the art. First, the polyepoxide is prepared typically by chain extending with bisphenol A or other active hydrogen compounds. Second, the polyepoxide is defunctionalized by reacting with the oxygen substituted diamine with or without any of the aforementioned additional amines through reaction with the polyepoxide upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic to a temperature in the range of about 120° C. to 150° C. and cooling may be desired. However, the reaction mixture may be heated to a moderate temperature, that is, from about 50° C. to 150° C. The resultant reaction product is then dispersed in a mixture of water and acid. Also with the addition of the amine, the capped or partially capped isocyanate curing agent can be, and suitably is added. By "nongelled" is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure.

The present invention employs a novel method for making the active hydrogen-containing electrodepositable resin composition with the isocyanate curing agent. The novel method comprises mixing together in a suitable reaction vessel polyepoxide, diphenol, at least partially capped isocyanate curing agent, base catalyst, oxygen substituted diamine, and optionally but preferably one or more secondary amine and/or other aforementioned additional amine, and then reacting the mixture in one step. Optionally, a polycarboxylic acid, preferably a dicarboxylic acid can also be added to the mixture. It should be noted that the amines and base catalyst should be added to the mixture after the other components have been mixed together. Suitable base catalysts include triphenylphosphine, ethyltriphenyl phosphonium iodide, tetrabutyl phosphonium iodide and tertiary amines such as benzyldimethylamine, dimethylaminocyclohexane, triethylamine, and the like, N-methylimidazole, and tetrabutyl ammonium hydroxide. The amount of the base catalyst can be an amount similar to that of U.S. Pat. No. 5,260,354 to Kaylo et al. as an effective catalytic amount. Generally, such an amount is a small amount ranging from about 0.005 to about 0.15 percent by weight of the reactants. Typically, the reaction is carried out at about 80° C. to 140° C. for about 1 to 6 hours in an inert atmosphere. The resultant reaction product is then neutralized by adding the reaction product to a dilute mixture of acid and water to form a stable dispersion.

Dispersions for either of the aforementioned methods are accomplished by this neutralization of all or part of the amino groups with acid as is known to those skilled in the art. Examples of suitable acids include organic and inorganic acids such as formic acid, acetic acid, lactic acid, phosphoric acid, sulfamic acid, and carbonic acid. The preferred acid is sulfamic acid. The extent of neutralization will depend on the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used. It is desirable to electrodeposit the coating compositions of this invention from a solution having a pH between about 3 to about 9, preferably from about 5 to about 7. Neutralization should produce a stable dispersion which means one that does not settle or is easily redispersible if some settling occurs.

The electrodepositable composition of the present invention also usually contains a pigment which is incorporated into the composition in the form of a paste. The pigment paste is prepared by grinding or dispersing a pigment into a grinding vehicle and optional ingredients such as wetting agents, surfactants and defoamers. Grinding is usually accomplished by the use of ball mills, Cowles dissolvers, continuous attritors and the like until the pigment has been reduced to the desired size and has been wetted by and dispersed by the grinding vehicle. After grinding, the particle size of the pigment should be as small as practical, generally, a Hegman grinding gauge rating of about 6 to 8 is usually employed. Suitable pigment grinding vehicles can be selected from those known in the art.

Nonlimiting examples of pigments which can be employed in the practice of the invention include titanium dioxide, carbon black, iron oxide, clay, talc, silica, strontium chromate, coal dust, barium sulfate and phthalocyanine blue. Pigments with high surface areas and oil absorbencies should be used judiciously because they can have an undesirable effect on coalescence and flow. The pigment content of the dispersion is usually expressed as the pigment to resin ratio. In the practice of the invention, the pigment to resin ratio is usually within the range of 0.05 to 1:1.

In addition to the above-described components, the present composition can also include various additives such as: surfactants, wetting agents, catalysts, film build additives, flatting agents, defoamers, and additives like those of U.S. Pat. No. 4,423,166 to enhance flow and appearance of the composition, cationic microgels like those of U.S. Pat. No. 5,096,556, and pH control additives. The latter additive can be the at least partially neutralized polyepoxide-amine adducts with higher pH sufficient to adjust the pH of the bath to the aforementioned desired range, if necessary.

Examples of surfactants and wetting agents include alkyl imidazolines such as those available from Geigy Industrial Chemicals as GEIGY AMINE C and acetylenic alcohols available from Air Products and Chemicals as SURFYNOL. Examples of defoamers are FOAM KILL 63, hydrocarbon oil containing inert diatomaceous earth available from Crucible Chemical. Examples of anti-cratering agents are polyoxyalkylene-polyamine reaction products such as those described in U.S. Pat. No. 4,432,850. These optional ingredients when present may constitute up to 30, usually 1 to 20 percent by weight of resin solids.

Curing catalysts such as tin catalysts can be present in the composition. Some examples include dibutyltin dilaurate and dibutyltin oxide. Optionally, a co-catalyst can be employed, such as water immiscible acids and those in International Publication No. WO96/12771, and gum rosin. When used, catalysts are typically used in amounts of 0.05 to 5 percent by weight based on weight of resin solids.

The electrodepositable coating compositions of the present invention are dispersed in aqueous medium. The term "dispersion" as used within the context of the present invention is believed to be a two-phased translucent or opaque aqueous resinous system in which the resin is in the dispersed phase and water the continuous phase. The average particle size diameter of the resinous phase is about 0.1 to 10, preferably less than 5 microns. The concentration of the resinous products in the aqueous medium is, in general, not critical, but ordinarily the major portion of the aqueous dispersion is water. The aqueous dispersion usually contains from about 3 to 75, typically 5 to 50 percent by weight resin solids. Aqueous resin concentrates can be further diluted with water upon preparation of electrodeposition baths. Fully diluted electrodeposition baths generally have resin solids contents of about 3 to 25 percent by weight.

Besides water, the aqueous medium may contain a coalescing solvent. Useful coalescing solvents include hydrocarbons, alcohols, esters, ethers and ketones. The preferred coalescing solvents include alcohols, polyols, ethers and ketones. Specific coalescing solvents include isopropanol, butanol, 2-ethylhexanol, isophorone, 4-methoxy-2-pentanone, ethylene and propylene glycol and the monoethyl, monobutyl and monohexyl ethers of ethylene glycol. The amount of the coalescing solvent is not unduly critical for the performance but is minimized for environmental reasons and is generally present in an amount of up to 5 percent by weight, preferably, about 0.05 to about 5 percent by weight based on total weight of the aqueous medium.

In the process of electrodeposition, the electrodepositable composition is placed in contact with an electrically conductive anode and an electrically conductive cathode. Upon passage of the electric current between the anode and cathode while in contact with the aqueous dispersion, an adherent film of the coating composition will deposit in a substantially continuous manner on the cathode. The conditions under which electrodeposition is carried out are well known in the art. Electrodeposition is usually carried out at a constant voltage. The applied voltage may vary greatly and can be, for example, as low as 2 volts or as high as several thousand volts, although typically between 50 volts and 500 volts are employed. Current density is usually between about 1.0 ampere and 15 amperes per square foot (10.8 to 161.5 amperes per square meter) and tends to decrease quickly during electrodeposition indicating formation of a continuous self-insulating film. Any electroconductive substrate especially metal such as steel, zinc, aluminum, copper, magnesium or the like can be electrocoated with the coating compositions of the present invention. However, the invention is particularly desirable for the coating of steel substrates because of the outstanding corrosion resistance it provides to the substrate. Although it is conventional to pretreat the steel substrate with a phosphate conversion coating followed by a chromic acid or nonchromic acid rinse before electrodeposition, the electrodeposition process of the present invention can be utilized with steel substrates which have not been given a chrome rinse and still provide for outstanding corrosion resistance.

After deposition, the coating is cured at elevated temperatures by any convenient method such as by baking in ovens. The curing temperature will typically be conducted over the range of from about 120° C. to 250° C., preferably from 120° C. to 190° C., for anywhere from 10 to 60 minutes. The thickness of the resultant film will typically vary from about 10 to 50 microns.

The invention will further be described by reference to the following examples which are presented for the purpose of illustration only and are not intended to limit the scope of the invention.

EXAMPLE A

PART I

Preparation of a Dicarboxylic Acid Adduct

A dicarboxylic acid adduct was prepared by the following procedure. To a reactor fitted with a stirrer, nitrogen inlet and condenser was added 160.8 parts of hexahydrophthalic anhydride, 328.7 parts of a diol made from bisphenol A (1 mole) and ethylene oxide (9 moles) and 0.5 parts of triethylamine. The reaction mixture exothermed and was held at 90° C. to 100° C. until the anhydride peaks in the infrared spectrum disappeared. The dicarboxylic acid adduct had an acid number of 120.

PART II

Preparation of a Blocked Isocyanate Crosslinker

A blocked isocyanate crosslinker was prepared by the following method. To a reactor fitted with a stirrer, nitrogen inlet, condenser and addition port was added 115.9 parts of butyl CELLOSOLVE[1] and 74.7 parts of propylene glycol. The mixture was heated to 50° C. to 55° C. and 259.4 parts of PAPI 2940[2] was then added over a period of 2.5 to 3.0 hours. The exotherm was held below 100° C. during the addition and the reaction was held for 1.0 hours at 90° C. after the addition was complete. The infrared spectrum showed complete reaction of the isocyanate group (disappearance of the 2270 reciprocal centimeters ($cm^{-1}$ band)). Methylisobutyl ketone, 50 parts, was then added and the crosslinker was discharged from the reactor.

[1] Ethylene glycol monobutyl ether, available from Union Carbide Chemicals and Plastics Co., Inc.
[2] Polymeric methylene diphenyl diisocyanate having an isocyanate functionality of 2.3, available from Dow Chemical Company.

PART III

Preparation of an Active Hydrogen-containing Electrodepositable Resin Composition of the Present Invention An active hydrogen-containing electrodepositable resin composition of the present invention, containing aminopropyldiethanolamine, was prepared by the following method. In a reactor fitted with a stirrer, nitrogen inlet and condenser, there was added components A through F of Table 1, below. The contents of the reactor were brought to 80° C. and items G through I were added. An immediate exotherm occurred and the temperature was allowed to rise to 120° C. to 130° C. The reaction mixture was held at 120° C. for 2.0 hours. A sample taken after 1.5 hours had an acid number equal to zero and epoxide equivalent weight greater than 20,000, indicating the complete reaction of the acid and epoxide. The contents of the reactor were dispersed into a mixture of components J through K. After the dispersion was made, component L was added. The dispersion was then vacuum stripped to azeotropically remove the methylisobutyl ketone used as a solvent and component M was then added. The product was an electrodepositable aqueous dispersion having a solids content of 40.3 percent by weight with a particle size of 821 Angstroms and a Brookfield viscosity of 70 centipoise.

TABLE 1

| Component | Parts by Weight |
| --- | --- |
| A. EPON 880[1] | 85.7 |
| B. Dicarboxylic acid of Example A, Part I | 54.8 |
| C. Bisphenol A | 28.0 |
| D. Crosslinker of Example A, Part II | 128.9 |
| E. Tetronic 150R1[2] | 0.08 |
| F. Methylisobutyl ketone | 8.0 |
| G. Benzyldimethylamine | 0.2 |
| H. Aminopropyldiethanolamine | 13.9 |
| I. Diethanolamine | 4.5 |
| J. Sulfamic acid | 6.7 |
| K. Deionized water | 466.5 |
| L. Gum rosin[3] | 1.5 |
| M. Rhodameen C-5[4] | 3.0 |

[1] Polyglycidyl ether of bisphenol A, available from Shell Chemical Co.
[2] A surfactant consisting of an ethylene - propylene oxide adduct of ethylene diamine containing a 90:10 ratio of propylene oxide to ethylene oxide, and being propylene oxide terminated, commercially available from BASF Corporation.
[3] A rosin containing 10% neutral materials and 90% rosin acid of which 90% is abietic acid (and isomers) and 10% is a mixture of dihydroabietic acid and dehydroabietic acid, commercially available from Colyer Chemical Co.
[4] A surfactant consisting of pentaethoxylated cocoamine, commercially available from Rhone-Poulenc.

EXAMPLE B

An active hydrogen-containing electrodepositable resin composition of the present invention, containing aminopropylmorpholine, was prepared by a method similar to that of Example A, Part III. Components A through E of Table 2 were charged to the reactor, the temperature was taken to 80° C. and then components F through H were added. After the exotherm, the reaction was held at 120° C. for 2.0 hours. The reaction mixture was then dispersed into a mixture of components I, J, and L, and then component K was added. The dispersion was vacuum stripped to give an electrodepositable aqueous dispersion with a solids content of 46.5 percent by weight.

TABLE 2

| Component | Parts by Weight |
| --- | --- |
| A. EPON 880 | 45.1 |
| B. Dicarboxylic acid of Example A, Part I | 28.8 |
| C. Bisphenol A | 14.7 |
| D. Crosslinker of Example A, Part II | 64.2 |
| E. Tetronic 150R1 | 0.04 |
| F. Benzyldimethylamine | 0.09 |
| G. Aminopropylmorpholine | 6.5 |
| H. Diethanolamine | 2.4 |
| I. Sulfamic acid | 3.3 |
| J. Deionized water | 167.6 |
| K. Gum rosin | 0.7 |
| L. Rhodameen C-5 | 1.4 |

EXAMPLES C–E

COMPARATIVE

Active hydrogen-containing electrodepositable resin compositions containing dimethylaminopropylamine or diethylaminopropylamine were prepared by a method similar to that of Example A, Part III except a different crosslinker was used. This blocked isocyanate crosslinker referred to as "PART IIB" was prepared in a procedure identical to that in PART II of Example A, except that no methylisobutyl ketone was used. For each example (C–E), components A through F of Table 3 were charged to the reactor, the temperature was taken to 80° C. and then components G through H were added. After the exotherm, the reaction was held at 120° C. for 2.0 hours. The reaction mixture was then dispersed into a mixture of components I, J, and L, and then component K was added. The amounts listed in Table 3 are parts by weight.

TABLE 3

| Component | Example C | Example D | Example E |
|---|---|---|---|
| A EPON 880 | 45.1 | 45.1 | 45.1 |
| B Dicarboxylic acid of Example A, Part I | 28.8 | 28.8 | 28.8 |
| C Bisphenol A | 14.7 | 14.7 | 14.7 |
| D Crosslinker Part IIB | 61.1 | 61.1 | 61.1 |
| E Tetronic 150R1 | 0.04 | 0.04 | 0.04 |
| F Butylcarbitol formal | 3.3 | 3.3 | 3.3 |
| G Dimethylaminopropylamine | 1.7 | 2.3 | — |
| Diethylaminopropylamine | — | — | 2.2 |
| H Diethanolamine | 8.3 | 7.1 | 8.3 |
| I Sulfamic acid | 3.3 | 3.4 | 3.4 |
| J Deionized water | 181.8 | 181.8 | 214.7 |
| K Gum rosin | 0.7 | 0.7 | 0.7 |
| L Rhodameen C-5 | 1.4 | 1.4 | 1.4 |
| % Solids by Weight | 44.1 | 43.1 | 39.9 |

EXAMPLES F–J

Examples F through J below are active hydrogen-containing electrocoatable resin compositions prepared by a method similar to that of Examples A (Part III) and B. In these examples the secondary amine differed from the diethanolamine of Example A (Part III), which was component I, by substitution with one of the following amines hydroxyethylpiperazine (HEPIP), N-methylpiperazine (NMPIP), morpholine (MOR), or dicocoamine (DICOCO). These substitutions were made at equal levels of amine equivalents for the diethanolamine.

For each example (F–J), components A through F of Table 4 were charged to the reactor, the temperature was taken to 80° C. and then components G through H were added. After the exotherm, the reaction was held at 120° C. for 2.0 hours. The reaction mixture was then dispersed into a mixture of components I, J, and L, and then component K was added followed by component M. The amounts listed in Table 4 are parts by weight.

TABLE 4

| Component | Example F | Example G | Example H | Example J |
|---|---|---|---|---|
| A EPON 880 | 45.1 | 45.1 | 45.1 | 45.1 |
| B Dicarboxylic acid of Example A, Part I | 28.8 | 28.8 | 28.8 | 28.8 |
| C Bisphenol A | 14.7 | 14.7 | 14.7 | 14.7 |
| D Crosslinker Part IIB | 55.0 | 55.0 | 55.0 | 55.0 |
| E Tetronic 150R1 | 0.04 | 0.04 | 0.04 | 0.04 |
| F Butylcarbitol formal | — | 6.1 | — | — |
| Benzyldimethylamine | 0.09 | — | — | 0.09 |
| G Aminopropyldiethanolamine | 7.3 | 7.3 | 7.5 | 7.3 |
| H N-hydroxyethylpiperazine | 2.9 | — | — | — |
| N-methylpiperazine | — | 2.3 | — | — |
| Morpholine | — | — | 2.0 | — |
| Dicocoamine | — | — | — | 8.3 |
| I Sulfamic acid | 3.3 | 3.3 | 3.3 | 3.3 |
| J Deionized water | 175.9 | 166.4 | 174.4 | 175.9 |
| K Gum rosin | 1.5 | 1.5 | 1.4 | 1.5 |
| L Rhodameen C-5 | 1.5 | 1.5 | 1.4 | 1.5 |
| M Deionized water | 59.4 | 61.3 | 58.9 | 61.3 |
| % Solids by Weight | 37.8 | 38.0 | 37.5 | 28.1 |

EXAMPLES I–V

Roman Numerals

The active hydrogen-containing electrodepositable resin compositions of Examples A through E were used to make the electrodeposition compositions of Examples I through V below. Examples I through V illustrate the effect of changing the pendant tertiary amine used in the epoxy chain extension of the electrodepositable resin compositions of Examples A through E. Examples III through V are comparative examples. The various amines used in Examples A through E were the oxygen substituted diamine aminopropyldiethanolamine (APDEA) (Example A) and aminopropylmorpholine (APM) (Example B) and comparative amines, dimethylaminopropylamine (DMAPA) (Examples C and D) and diethylaminopropylamine (DEAPA)( Example E). A secondary amine, diethanolamine (DEA), was also used in Examples A through E.

Baths of the cationic electrodepositable composition were prepared, in a suitable container, for each of Examples I through V by mixing together, under agitation, the ingredients in Table 5 in the order listed. The amounts listed in Table 5 are parts by weight.

TABLE 5

| Ingredients | I | II | III | IV | V |
|---|---|---|---|---|---|
| Resinous composition of Example: | | | | | |
| A | 1534.0 | — | — | — | — |
| B | — | 1363.6 | — | — | — |
| C | — | — | 1363.6 | — | — |
| D | — | — | — | 1614.7 | — |
| E | — | — | — | — | 1538.2 |
| Co-resin 1[1] | 220.8 | 220.8 | 220.8 | 220.8 | 220.8 |
| Co-resin 2[2] | 80.8 | 80.8 | 80.8 | 80.8 | 80.8 |
| Co-resin 3[3] | 108.5 | 108.5 | 108.5 | 108.5 | 108.5 |
| Pigment paste[4] | 155.0 | 155.0 | 155.0 | 155.0 | 155.0 |
| Deionized water | 1700.9 | 1871.3 | 1871.3 | 1620.2 | 1696.7 |

[1] An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flexibilizer-flow control agent was dispersed in aqueous medium with the aid of lactic acid and the dispersion had a resin solids content of 35.4 percent by weight.
[2] A cationic microgel prepared as generally described in Examples A and B of U.S. Pat. No. 5,096,556, with the exceptions that acetic acid instead of lactic acid was used to disperse the soap of Example A, that ethylene glycol butyl ether instead of methylisobutyl ketone was used as a solvent in the soap of Example A, and that EPON 828 solution was added after stripping rather than before in Example B. The resin had a final weight solids content of 18.3 percent.
[3] A pH control additive consisting of an epoxy monomer (EPON 880) advanced by Bisphenol A in the presence of ethyltriphenylphosphonium iodide catalyst to an epoxy equivalent weight of approximately 750. The reaction is quenched with diketimine, then dispersed into acetic acid and water. In water, the ketimine undergoes hydrolysis leaving the primary amine exposed which is basic giving the additive a pH of approximately 8.
[4] A pigment paste commercially available as E-6160 from PPG Industries, Inc., containing 53.7% titanium dioxide, 31.4% aluminum silicate, 12.7% dibutyltin oxide, and 2.2% carbon black.

Zinc phosphated panels were electrocoated with teh electrodeposition compositions of Examples I through V at voltages ranging from 160 and 375 volts, for two minutes at bath temperatures ranging from 90° F. to 95° F. (32° C. to 34° C.), rinsed with deionized water, and baked at various temperatures as listed below in Table 6. The bath temperature and coating voltage were sleected to produce a final cured film of about 0.95 mil (24 microns). The panels were elaluated for cure response, chip resistance, and corrosion. Throw power was also determined for each of the compositions with the results displayed in Table 6 below.

TABLE 6

| Example | Amine | Volts | Chip[1] | Corrosion[2] | Throw Power[3] | | Cure Response | | |
| --- | --- | --- | --- | --- | --- | --- | --- | --- | --- |
| | | | | | European[4] | Box[5] | Acetone Resistance[6] | TMA[7] °F./°C. | TMA[8] |
| I | APDEA | 240 | + | pass | 21.4 cm | 50% | 300° F./149° C. | 301/149 | 88.0° C. |
| II | APM | 375 | + | pass | 22.1 cm | 49% | 300° F./149° C. | 296/147 | 88.2° C. |
| III | DMAPA | 160 | − | pass | 15.5 cm | 13% | 330° F./166° C. | 320/160 | 85.6° C. |
| IV | DMAPA | 240 | − | pass | 18.4 cm | 39% | 340° F./171° C. | 312/156 | 85.8° C. |
| V | DEAPA | 200 | − | pass | 17.2 cm | 36% | 320° F./160° C. | 314/157 | 85.3° C. |

[1]Stone chip resistance was measured by gravimeter testing (ASTM D-3170 operated with the panels cooled to −30° C.). Panels were initially evaluated on a rating scale of 0 to 10 with 0 representing badly chipped panels and 10 representing very good chip performance. In the table above, the results are a comparison with similar panels electrocoated with ED5050, a commercial lead containing pant used as a control. The plus sign indicates better performance than the control, while the minus indicates worse performance.

[2]Corrosion resistance as measured by General Motors test method GM9540-P, Cyclic corrosion test. After preparation, the test panels were treated at 25° C. and 50% relative humidity (RH) for 8 hours, including 4 sprays at 90-minute intervals with a solution containing 0.9% NaCl, 0.1% $CaCl_2$, and 0.25% $NaHCO_3$ in deionized water. The test panels were then subjected to an 8-hour fog, 100% RH at 40° C., followed by 8 hours at 60° C. and less than 20% RH. The entire treatment is repeated for the desired number of cycles, 40 cycles for this test.

[3]"Throw power" is defined as the ability of a paint to electrocoat surfaces enclosed in a box-like structure. Various model boxes have been designed to reproducibly measure this property. Two of these are described below in footnotes 4 and 5.

[4]A box was constructed of phosphated steel panels having dimensions of 27.5 × 8.5 × 0.4 cm open to the paint bath only on the 8.5 × 0.4 cm side. After coating this assembly with conditions which give the nominal 0.95 mil (24 microns) film thickness on the outside of the box, the length of the box over which coating was deposited was measured from the opening to where the paint stops coating.

[5]A box was constructed with four cold rolled steel test panels measuring 15 cm long by 7 cm wide and two rubber gaskets measuring 15 cm long and 58 cm wide and 18 cm thick. Three of the four test panels contain a 7 mm hole located 5 cm from the bottom of the panel and 3.5 cm from its side. The rubber gaskets acted as the sides of the box while panel No. 1 formed the front and panel No. 4 formed the back (panel No. 4 had no hole). The bottom of the box was sealed with 3-inch masking tape and the top of the box was open to the atmosphere. The four panels were parallel to each other and spaced as follows: 10 cm between Nos. 1 and 2; 22 cm between Nos. 2 and 3; 10 cm between Nos. 3 and 4. The surfaces of the panels were referenced as A through H, with surface A, C, E, G facing the front of the box. The whole assembly was partially immersed in the electrocoat paint bath to a depth of 9 cm such that the holes in panels 1 through 3 were approximately 4 cm below the surface of the bath and the top of the box remained open to the atmosphere. The four panels were electrically connected to the cathode of a power supply, and a 15 cm by 7 cm stainless steel anode was placed 15 cm from surface A. The panels were then coated for 3 minutes at the voltage listed above. Throw power was defined for this test as the ratio, given as a percentage, of the film thickness measured on surface G (panel No. 4) to the film thickness measured on surface A (panel No. 1).

[6]An acetone saturated cloth was firmly rubbed back and forth across the cured coating surface 100 times for panels baked at 280° F. (138° C.), 300° F. (149° C.), 310° F. (154° C.), 320° C. (160° C.), 330° F. (166° C.), and 340° F. (171° C.) each for 30 minutes. The reported result is the minimum bake temperature needed to produce a film which is not marred by this treatment.

[7]TMA, Thermomechanical analysis was performed on specimens of each of the panels described in footnote 6 above. A complete description of this test is given in ASTM test method E1545. Conditions included use of a hemispherical probe loaded to 0.2 newtons with a heating rate of 10° C. per minute. The observed extrapolated onset softening temperatures were plotted versus bake temperature, curves were fitted to the data, and the minimum bake temperature needed to reach a softening temperature of 85° C. was reported in the table. Lower reported minimum bake temperatures indicate better cure response.

[8]The softening temperature described in footnote 7 above stops increasing at sufficiently high bake temperatures. The reported temperature is this limiting value of softening temperature. Higher reported temperatures indicate better cure response.

The data in Table 6 show that the electrodeposition coatings of the present invention, which contain amine compounds having oxygen atoms in the pendant part of the amine moiety, offer advantages in cure response (cure at lower temperatures), chip resistance, and improved throw power.

EXAMPLES VI–IX

The active hydrogen-containing electrodepositable resin compositions of Examples F through J were used to make the electrodepositable compositions, of the present invention, in Examples VI through IX. Examples VI through IX illustrate the use of various secondary amines in electrodepositable compositions of the present invention.

Baths of cationic electrodepositable composition were prepared, in a suitable container, for each of Example VI through IX by mixing together, under agitation, the ingredients in Table 7 in the order listed. The amounts listed in Table 7 are parts by weight.

TABLE 7

| Ingredients | VI | VII | VIII | IX |
|---|---|---|---|---|
| Resinous composition of Example: | | | | |
| F | 1538.2 | — | — | — |
| G | — | 1538.2 | — | — |
| H | — | — | 1538.2 | — |
| J | — | — | — | 1538.2 |
| Co-resin 1 of Example I | 220.8 | 220.8 | 220.8 | 220.8 |
| Co-resin 2 of Example I | 80.8 | 80.8 | 80.8 | 80.8 |
| Co-resin 3 of Example I | 108.5 | 108.5 | 108.5 | 108.5 |
| Pigment paste of Example I | 155.0 | 155.0 | 155.0 | 155.0 |
| Deionized water | 1696.7 | 1696.7 | 1696.7 | 1696.7 |

Zinc phosphated panels were electrocoated with the electrodeposition coating compositions of Examples VI through IX at voltages ranging from 160 to 375 volts, for two minutes at bath temperatures ranging from 90° F. to 95° F. (32° C. to 35° C.), rinsed with deionized water, and baked at various temperatures as listed in Table 8. The bath temperature and coating voltage were selected to produce a final cured film of about 0.95 mil (24 microns). The baths were evaluated for pH. The panels were evaluated for cure response and throw power. The results are displayed in Table 8 below.

TABLE 8

| | | | | Throw Power[1] | | Cure Response | | |
|---|---|---|---|---|---|---|---|---|
| | Secondary | | | | | Acetone | | |
| Example | Amine | pH | Volts | European[2] | Box[3] | Resistance[4] | TMA[5] | TMA[6] |
| I | DEA | 5.86 | 240 | 21.4 cm | 50% | 300° F./149° C. | 301° F./149° C. | 88.0° C. |
| VI | HEPIP | 5.95 | 275 | 17.5 cm | 44% | 300° F./149° C. | 314° F./157° C. | 87.5° C. |
| VII | NMPIP | 5.75 | 250 | 18.0 cm | 50% | 330° F./166° C. | 340° F./171° C. | 83.5° C. |
| VIII | MOR | 5.57 | 275 | 17.9 cm | 52% | 290° F./143° C. | 298° F./148° C. | 90.3° C. |
| IX | DICOCO | 5.32 | 200 | 17.5 cm | 49% | 300° F./149° C. | —[7] | 66.0° C. |

[1]See footnote 3 of Table 6 above.
[2]See footnote 4 of Table 6 above.
[3]See footnote 5 of Table 6 above.
[4]See footnote 6 of Table 6 above.
[5]See footnote 7 of Table 6 above.
[6]See footnote 8 of Table 6 above.
[7]Up to a bake temperature of 340° F., a softening temperature of 85° C. is not attained.

Table 8 above shows the results for embodiments of the invention in which the secondary amine was varied. The data shows that adequate cure was obtained using a variety of secondary amines. Some amines gave lower temperature cures, but all were acceptable. When dicocoamine was used, a softer film was produced, but the acceptable acetone resistance of this material indicates that the films were cured. It was theorized that the softer films produced with cocoamine may be a result of the long fatty acid chain of dicocoamine plasticizing the film.

What is claimed is:

1. An electrodepositable composition comprising:

(A) an active hydrogen-containing cationic resin. electrodepositable on a cathode, comprising:
        (1) a polyepoxide:
        (2) an oxygen-substituted diamine compound having the following formula:

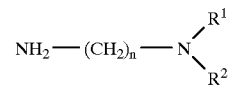

where n is an integer from 2 to 4; and where $R^1$ or $R^2$ are the same or different and are selected from the group consisting of: 1) $R^1$, $R^2$ and both contain at least one oxygen and are alkyl or cycloalkyl. having from 1 to 6 carbon atoms: 2) $R^1$, $R^2$ and both are alkanol groups having from 2 to 6 carbon atoms, and 3) $R^1$, $R^2$, and both contain at least one oxygen and have 1 to 6 carbon atoms and form a cyclic group with the N atom of the tertiary amine group: wherein the oxygen substituted diamine is an amine reactant for the polyepoxide to form an epoxide amine resinous adduct and is present in an amount of about 30 to 100 percent of the NH equivalents for the active hydrogen-containing cationic resin and on a weight basis is the predominant amine as an amine reactant to form the epoxide amine resinous adduct for the active hydrogen-containing cationic resin, and
        (3) a polycarboxylic acid and
    (B) at least partially blocked isocyanate curing agent. and wherein the electrodepositable composition is essentially free of polyoxyalkylene polyamine.

2. The electrodepositable composition of claim 1 wherein the polycarboxylic acid is a dicarboxylic acid.

3. The electrodepositable composition of claim 2 wherein the dicarboxylic acid is a reaction product of a diol and an anhydride.

4. The electrodepositable composition of claim 3 wherein the diol is the reaction product of bisphenol A and ethylene oxide and the anhydride is hexahydrophthalic anhydride.

5. The electrodepositable composition of claim 1 wherein the amount of polycarboxylic acid chain extends the polyepoxide and is sufficient to provide from about 0.05 to 0.6 acid groups per epoxide group.

6. The electrodepositable composition of claim 1 wherein the active hydrogen-containing cationic resin additionally comprises an additional amine selected from the group consisting of secondary amines, nonhydroxy-containing anines and amines with a ring structure wherein up to 70 percent of NH equivalents of the reactants for the electrodepositable cationic resin are supplied by the additional amine and about 30 to 100 percent of the NH equivalents of the reactants for the electrodepositable cationic resin are supplied by the oxygen-substituted diamine compound.

7. The electrodepositable composition of claim 6 wherein about 20 to 50 percent of NH equivalents of the reactants are supplied by the additional amine and about 50 to 80 percent of the NH equivalents of the reactants are supplied by the oxygen-substituted diamine compound.

8. The electrodepositable composition of claim 7 wherein about 20 to 30 percent of NH equivalents of the reactants are supplied by the additional amine and about 70 to 80 percent of the NH equivalents of the reactants are supplied by the oxygen-substituted diamine compound.

9. The electrodepositable composition of claim 6 wherein the amount of the oxygen-substituted diamine and the additional amine is sufficient so that the cationic resin has about 0.1 to 3.0 milliequivalents of cationic group per gram of resin solids of the electrodepositable cationic resin.

10. The electrodepositable composition of claim 1 wherein the polyepoxide is the reaction product of a polyglycidyl ether of a polyhydric alcohol and the equivalent ratio of the epoxy to polyhydric alcohol groups is from about 1:0.75 to 1:2.

11. The electrodepositable composition of claim 1 wherein the active hydrogen-containing cationic resin comprises:
    (1) a polyepoxide;
    (2) an oxygen-substituted diamine compound chosen from the group consisting of aminopropyldiethanolamine, aminopropylmorpholine, and N-(2-amino-ethyl)-morpholine;
    (3) an additional amine selected from the group consisting of secondary amines, nonhydroxy-containing amines and amines with a ring structure wherein up to 70 percent of NH equivalents of the reactants for the electrodepositable cationic resin are supplied by the additional amine and about 30 to 100 percent of the NH equivalents of the reactants for the electrodepositable cationic resin are supplied by the oxygen-substituted diamine compound;
    (4) a polycarboxylic acid; and
    (5) at least partially blocked isocyanate curing agent wherein the at least partially blocked isocyanate curing agent of (B) is part of the active hydrogen-containing cationic resin.

12. A method of producing an active hvdrogen-containing cationic resin composition, electrodepositable on a cathode. comprising:
    (a) mixing together in a suitable reaction vessel a polyepoxide or the precursors of the polyepoxide, a polycarboxylic acid and an at least partially blocked isocyanate curing agent;
    (b) adding to the mixture of (a) a base catalyst and an oxygen-substituted diamine compound having the following formula:

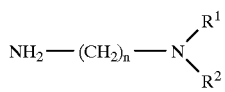

NHf (CH$_2$)nN where n is an integer from 2 to 4: and where R$^1$ or R- are the same or different and are selected from the group consisting of: 1) R$^1$. R$^2$. and both contain at least one oxygen and are alkvl or cycloalkyl. having from 1 to 6 carbon atoms: 2) R$^1$, R$_2$ and both are alkanol groups having from 2 to 6 carbon atoms: and 3) R$^1$, R$^2$ and both contain at least one oxygen and have 1 to 6 carbon atoms and form a cyclic group with the N atom of the tertiary amine group; wherein the oxygen substituted diamine is an amine reactant for the polyepoxide to form an epoxide amine resinous adduct and is present in an amount of about 30 to 100 percent of the NH equivalents for the active hydrogen-containing cationic resin and on a weight basis is the predominant amine as an amine reactant to form the epoxide amine resinous adduct for the active hydrogen-containing cationic resin;
    (c) polymerizing said mixture of (b) to form a resinous composition, and
    (d) neutralizing the resinous composition of (c) by adding the resinous composition to a dilute mixture of acid and water to form an aqueous dispersed cationic resin electrodepositable on a cathode from an electrodepositable composition that is essentially free of polyoxyalkylene polvamine.

13. The method of claim 12 wherein the mixing step (a) has the polycarboxylic acid which is a dicarboxylic acid.

14. The method of claim 13 wherein the mixing step (a) has the dicarboxylic acid which is a reaction product of a diol and an anhydride.

15. The method of claim 14 wherein the mixing step (a) has the diol which is the reaction product of bisphenol A and ethylene oxide; and the anhydride is hexahydrophthalic anhydride.

16. The method of claim 12 wherein in mixing step (a) the amount of polycarboxylic acid chain extends the polyepoxide and is sufficient to provide from about 0.05 to 0.6 acid groups per epoxide group.

17. The method of claim 12 wherein the adding step (b) includes an additional amine selected from the group consisting of a secondary amine, nonhydroxy-containing amines, and amines with a ring structure wherein up to 70 percent of NH equivalents of the reactants of the electrodepositable cationic resin are supplied by the additional amine and about 30 to 100 percent of the NH equiN-alents of the reactants are supplied by the oxygen-substituted diamine compound.

18. The method of claim 17 wherein the adding step (b) has about 20 to 50 percent of NH equivalents of the reactants are supplied by the additional amine and about 50 to 80 percent of the NH equivalents of the reactants are supplied by the oxygen-substituted diamijie compound.

19. The method of claim 17 wherein in adding step (b), the amount of the oxygen-substituted diamine and the additional amine is sufficient so that the cationic resin has about 0.1 to 3.0 milliequivalents of cationic group per gram of resin solids of the active hydrogen-containing electrodepositable cationic resin.

* * * * *

UNITED STATES PATENT AND TRADEMARK OFFICE
CERTIFICATE OF CORRECTION

PATENT NO.   : 5,936,012
DATED        : August 10, 1999
INVENTOR(S)  : Kaufman et al.

Page 1 of 1

It is certified that error appears in the above-identified patent and that said Letters Patent is hereby corrected as shown below:

Please amend the following claims:

Column 18,
Lines 10 and 11 after "2)", please correct the formual "R1." to -- $R^1$, --
Line 22, insert a semi-colon (--;--) after the word "acid" in item 3.
Line 60 and 61 after "non-hydroxy containing", please delete the word "anines and replace it with -- amines --.

Column 19,
Line 58, after the formula, please delete "NHf(CH2)nN"; at line 59, please delete "R-" and replace it with -- $R^2$-- ; and at column 20, lines 2 and 3, after "$R^1$," delete R2" and replace it with -- $R^2$ --.

Column 20,
Line 45, please delete the word "equiN-alents" and replace it with equivalents --.
Line 52, please delete the word "diamijie" and replace it with -- diamine--.

Signed and Sealed this

Seventh Day of August, 2001

*Attest:*

NICHOLAS P. GODICI
*Attesting Officer*   Acting Director of the United States Patent and Trademark Office